US009034496B2

(12) United States Patent
Adachi et al.

(10) Patent No.: US 9,034,496 B2
(45) Date of Patent: May 19, 2015

(54) BATTERY UNIT

(71) Applicant: DENSO CORPORATION, Kariya, Aichi-pref. (JP)

(72) Inventors: Yoshiki Adachi, Okazaki (JP); Tatsuya Saito, Chiryu (JP); Norihiko Ito, Okazaki (JP); Yuya Mizuma, Gamagori (JP)

(73) Assignee: DENSO CORPORATION, Kariya (JP)

( * ) Notice: Subject to any disclaimer, the term of this patent is extended or adjusted under 35 U.S.C. 154(b) by 109 days.

(21) Appl. No.: 13/684,414

(22) Filed: Nov. 23, 2012

(65) Prior Publication Data

US 2013/0130070 A1   May 23, 2013

(30) Foreign Application Priority Data

Nov. 23, 2011   (JP) .................. 2011-255635

(51) Int. Cl.
 *H01M 10/48* (2006.01)
 *H01M 2/10* (2006.01)
 *H01M 2/20* (2006.01)
 *H01M 10/42* (2006.01)
 *H01M 2/12* (2006.01)

(52) U.S. Cl.
 CPC .......... *H01M 10/482* (2013.01); *H01M 10/425* (2013.01); *H01M 2/12* (2013.01); *H01M 2/1205* (2013.01); *H01M 2/1211* (2013.01); *H01M 10/4207* (2013.01); *H01M 2/1077* (2013.01); *H01M 2/1241* (2013.01); *H01M 2/1252* (2013.01); *H01M 2/206* (2013.01)

(58) Field of Classification Search
 CPC ..................... H01M 10/4271; H01M 10/1252; H01M 2/12; H01M 2/1205; H01M 2/1211
 See application file for complete search history.

(56) References Cited

U.S. PATENT DOCUMENTS 6,111,387 A    8/2000  Kouzu et al.
2007/0000775 A1*  1/2007  Nakahara et al. ........ 204/297.01
(Continued)

FOREIGN PATENT DOCUMENTS

CN    101192659 A    6/2008
CN    102201557 A    9/2011
(Continued)

OTHER PUBLICATIONS

Notification of Reasons for Rejection dated Jun. 17, 2014 from Japanese Patent Application No. 2011-255635 (with English-language translation).

(Continued)

*Primary Examiner* — Jeremiah Smith
(74) *Attorney, Agent, or Firm* — Oliff PLC

(57) ABSTRACT

A battery unit has battery cells having electrode terminals, bus bars having voltage potential detection terminals, a control board having a voltage detection circuit and a discharge duct. In the battery cell, the electrode terminals of the battery cells are electrically connected to the voltage potential detection terminals of the bus bars. The voltage potential detection terminals of the bus bars are electrically connected to the voltage detection circuit formed on the control board through metal conductive members or lines. The voltage detection circuit detects a voltage potential of each of the battery cells through the metal conductive members. The metal conductive members are not dedicated components, and integrated with the discharge duct by insert molding.

4 Claims, 13 Drawing Sheets

(56) References Cited

U.S. PATENT DOCUMENTS

| | | | |
|---|---|---|---|
| 2008/0131760 A1* | 6/2008 | Yamagami et al. | 429/82 |
| 2009/0111007 A1* | 4/2009 | Naganuma | 429/82 |
| 2010/0248008 A1 | 9/2010 | Sugawara et al. | |
| 2011/0236739 A1* | 9/2011 | Watanabe et al. | 429/99 |
| 2011/0244282 A1* | 10/2011 | Seto et al. | 429/82 |
| 2012/0164490 A1* | 6/2012 | Itoi et al. | 429/7 |

FOREIGN PATENT DOCUMENTS

| | | | | |
|---|---|---|---|---|
| JP | A-10-270006 | 10/1998 | | |
| JP | A-2006-114430 | 4/2006 | | |
| JP | A-2009-59663 | 3/2009 | | |
| JP | A-2010-205509 | 9/2010 | | |
| JP | A-2010-238609 | 10/2010 | | |
| JP | A-2011-216400 | 10/2011 | | |
| WO | WO 2011/033713 | * | 3/2011 | H01M 2/20 |

OTHER PUBLICATIONS

Chinese Office Action dated Sep. 3, 2014 from Chinese Patent Application No. 201210466194.5 (with English-language translation).

* cited by examiner

BATTERY UNIT

CROSS-REFERENCE TO RELATED APPLICATION

This application is related to and claims priority from Japanese Patent Application No. 2011-255635 filed on Nov. 23, 2011, the contents of which are hereby incorporated by reference.

BACKGROUND OF THE INVENTION

1. Field of the Invention

The present invention relates to battery units equipped with a plurality of battery cells and a control board having a voltage detection circuit, in which electrode terminals of the battery cells are electrically connected to the voltage detection circuit through metal conductive members or lines capable of transmitting a voltage potential of the battery cells, and the voltage detection circuit detects a voltage of the battery cells through the conductive member.

2. Description of the Related Art

There is a conventional technique regarding a conventional battery unit, for example, disclosed in Japanese patent laid open publication NO. JP 2009-59663. The conventional battery unit has battery units, bus bars and a control board on which a voltage control device is formed. The voltage control device has a voltage detection circuit. The conventional battery unit has a structure in which adjacent battery cells are electrically connected to the corresponding bus bar, and the detection terminal is electrically connected to the corresponding bus bar. The voltage detection circuit in the voltage detection device detects a state of charge of each of the battery units through the detection terminal connected to the corresponding bus bar.

The voltage control device having the voltage detection circuit is electrically connected to the detection terminals through a conductive circuit substrate.

However, the structure of the conventional battery unit previously described is required to use one or more signal transmission components formed on a dedicated conductive circuit substrate through which information regarding a voltage potential of each of the battery cells is transmitted to the voltage detection circuit formed on the control board. To use such independent signal transmission components in the battery unit increases the total number of components and introduces a complicated structure.

SUMMARY

It is therefore desired to provide a battery unit having a simple structure without any dedicated signal transmission component, through which information regarding a voltage potential of each battery cell is transmitted to a voltage detection circuit formed on a control board.

An exemplary embodiment provides a battery unit having an improved structure. The battery cell has a plurality of battery cells, a control board, and plurality of conductive members. Each of the battery cells has an exterior casing and electrode terminals. The electrode terminals are composed of positive electrode terminal and negative electrode terminals. The positive electrode terminal and the negative electrode terminal are formed on an outside surface of the exterior casing of each of the battery cells. The control board has a voltage detection circuit configure to detect a voltage of each of the battery cells. Through the conductive members, a voltage potential of the electrode terminals of the battery cells is transmitted to the voltage detection circuit. One end part of each of the conductive members is electrically connected to the corresponding electrode terminals of the battery cell. The other end part of each of the conductive members is electrically connected to the voltage detection circuit. In particular, either a casing made of resin (such as a battery casing and an insulation cover, which will be described in embodiments later) containing the battery cells and at least a part of other components or a passage formation member made of resin forming a fluid passage therein. In the structure of the battery unit, the conductive members are integrated with either the casing or the passage formation member by insert molding. In other words, the conductive members are not dedicated so components in the battery unit, that is, are integrated with one of the cover casing and the passage formation member by insert molding.

In the improved structure of the battery unit according to an exemplary embodiment, the electrode terminals such as the positive electrode terminal and the negative electrode terminal of each of the battery cells are electrically connected to the voltage detection circuit formed on the control board through the corresponding conductive members such as metal conductive members or lines. In particular, these metal conductive members are integrated with one of the passage formation member such as the discharge duct and the cover casing by insert molding. Because the conductive members are integrated with the passage formation member by insert molding, or because the conductive member are integrated with the cover casing by insert molding, it is not necessary to use additional support member to support the conductive members such as the metal conductive members. This can provide the battery cell having a simple structure. By the way, the cover casing contains at least a part of the battery cells and other components therein. The passage formation member has a fluid passage such as a discharge passage.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
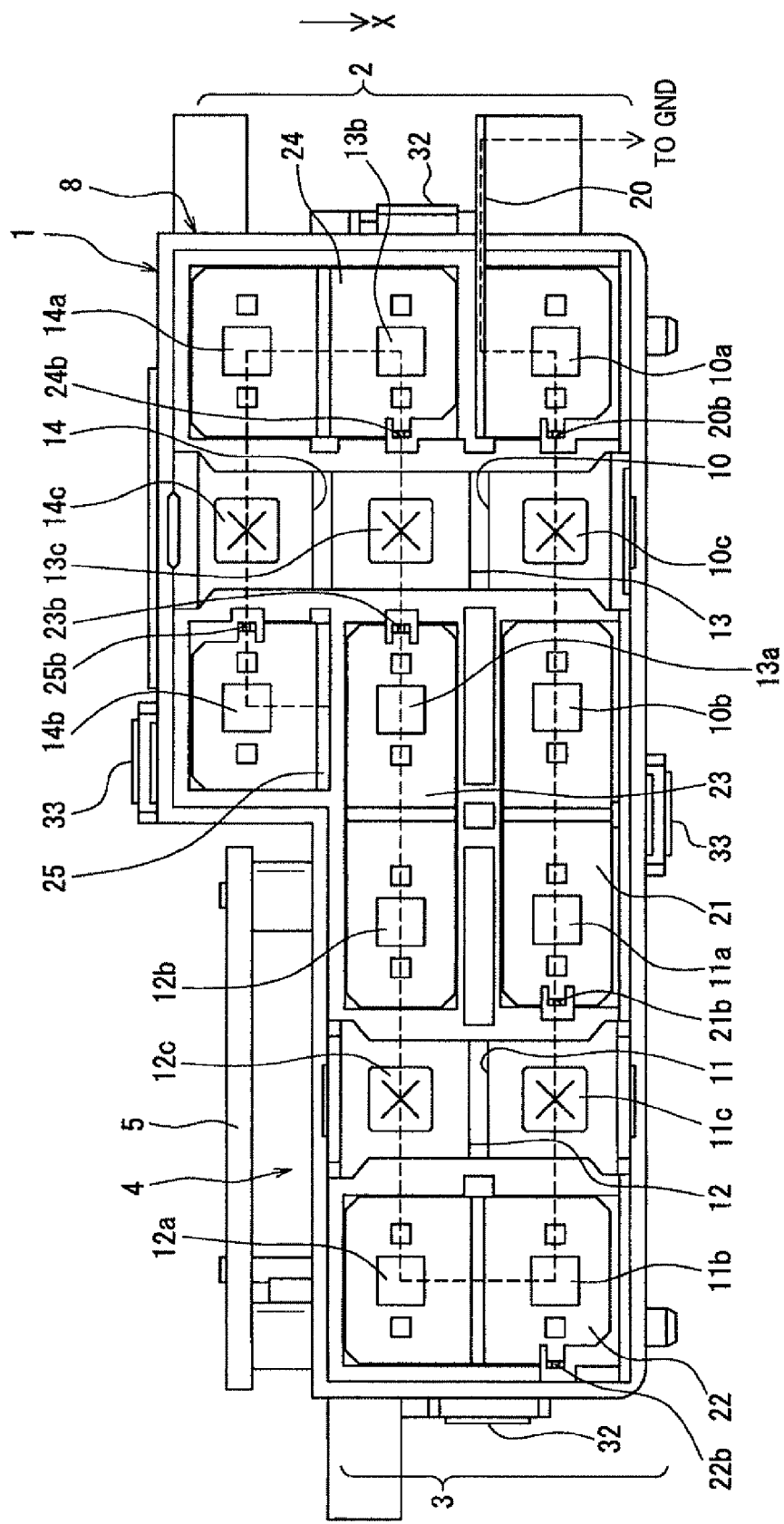
FIG. 1 is a front view showing a schematic structure of a battery unit composed of a control board and an assembled battery having battery cells according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Through the following first to fourth exemplary embodiments according to the present invention, the same components will be referred to with the same reference number and characters for brevity.

First Exemplary Embodiment

A description will be given of a battery unit 1 according to a first exemplary embodiment with reference to FIG. 1 to FIG. 11.

Figure 2:
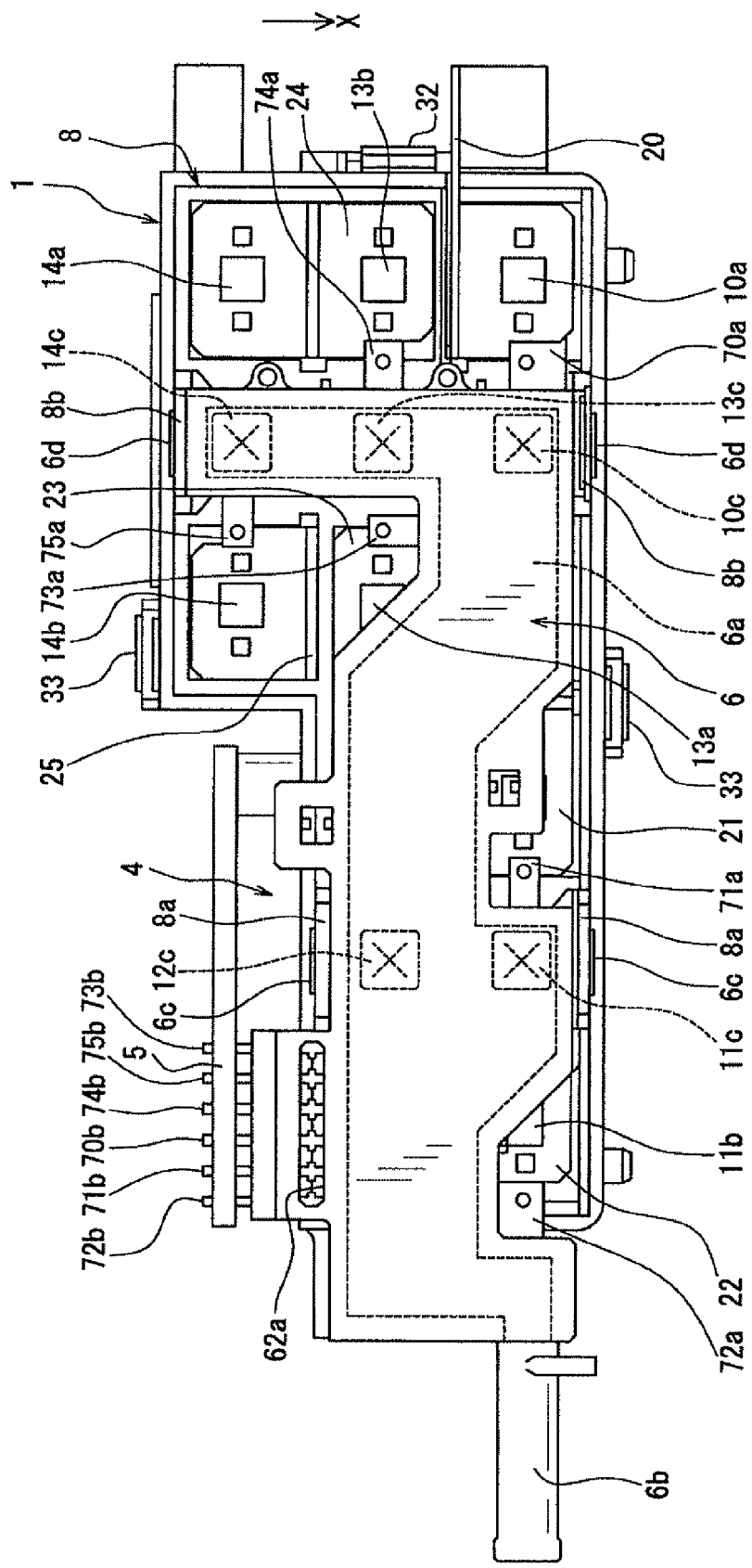
FIG. 2 is a front view showing a schematic structure of the assembled battery, a control board and a discharge duct which are main components of the battery unit according to the first exemplary embodiment of the present invention.
Figure 3:
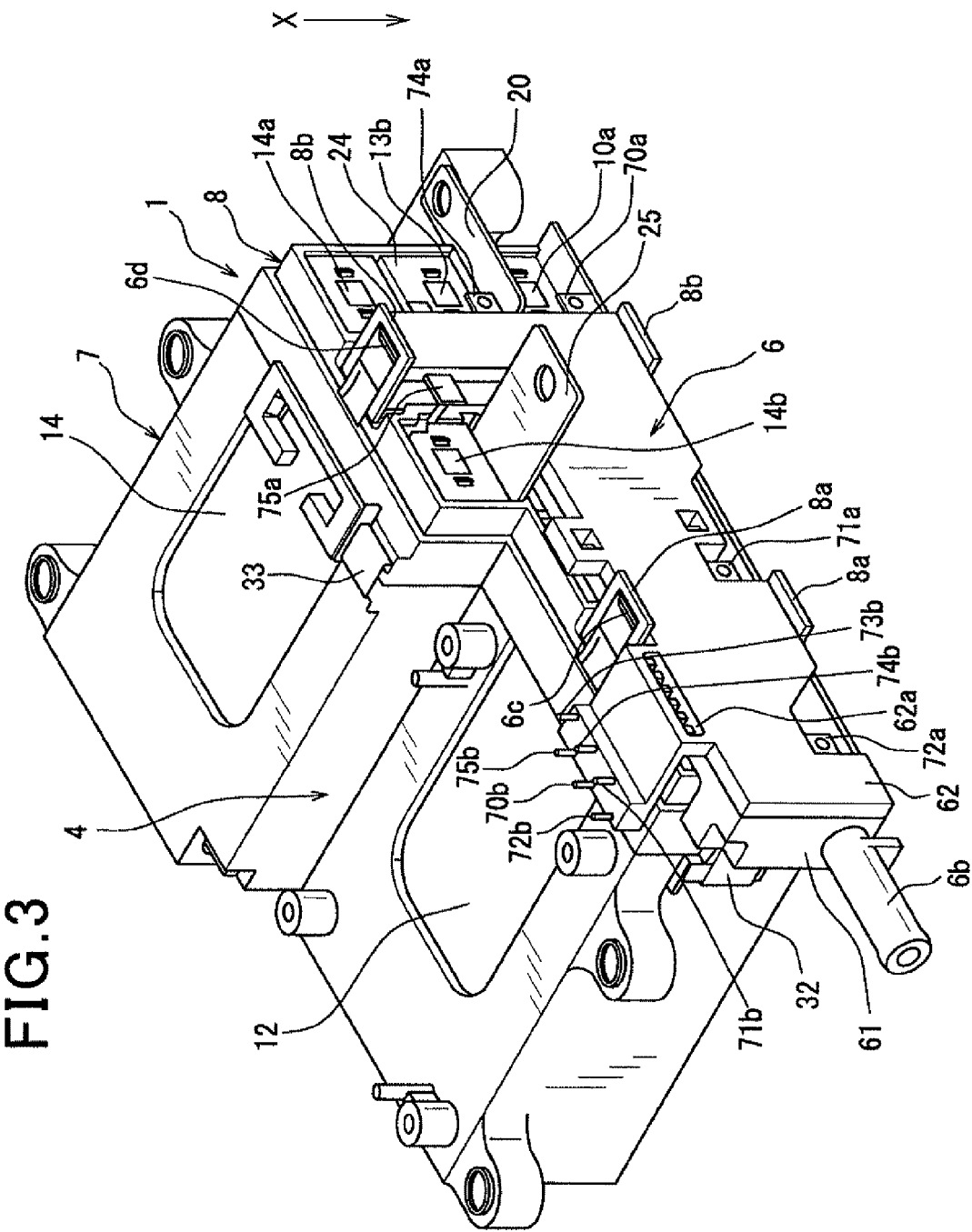
FIG. 3 is a perspective view showing an arrangement of the assembled battery and the discharge duct in the battery unit according to the first exemplary embodiment of the present invention.
Figure 4:
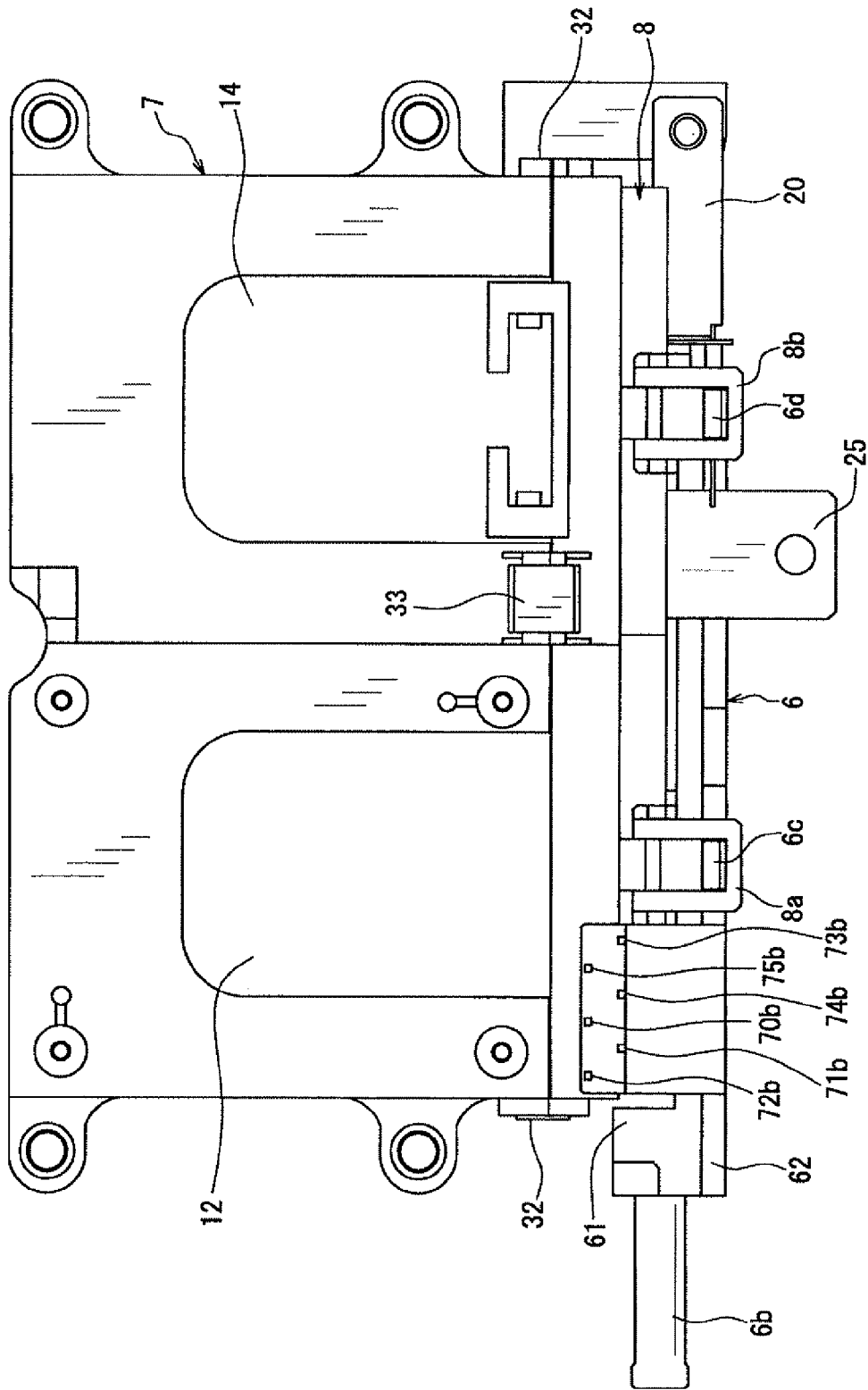
FIG. 4 is a plan view showing the arrangement of the assembled battery and the discharge duct in the battery unit according to the first exemplary embodiment of the present invention.

FIG. 1 is a front view showing a schematic structure of the battery unit 1 composed of a control board 5 and an assembled battery having battery cells 10, 11, 12, 13 and 14 according to the first exemplary embodiment of the present invention. FIG. 2 is a front view showing a schematic structure of the assembled battery having battery cells 10, 11, 12, 13 and 14, the control board 5 and a discharge duct 6 (or a passage formation member) in the battery unit 1 according to the first exemplary embodiment of the present invention. The control board 5, the discharge duct 6 and the assembled battery composed of the battery cells 10, 11, 12, 13 and 14 are main components of the battery unit 1 according to the first exemplary embodiment. FIG. 3 is a perspective view showing an arrangement of the assembled battery and the discharge duct 6 in the battery unit 1 according to the first exemplary embodiment of the present invention. FIG. 4 is a plan view showing the arrangement of the assembled battery and the discharge duct 6 in the battery unit 1 according to the first exemplary embodiment of the present invention.

Figure 5:
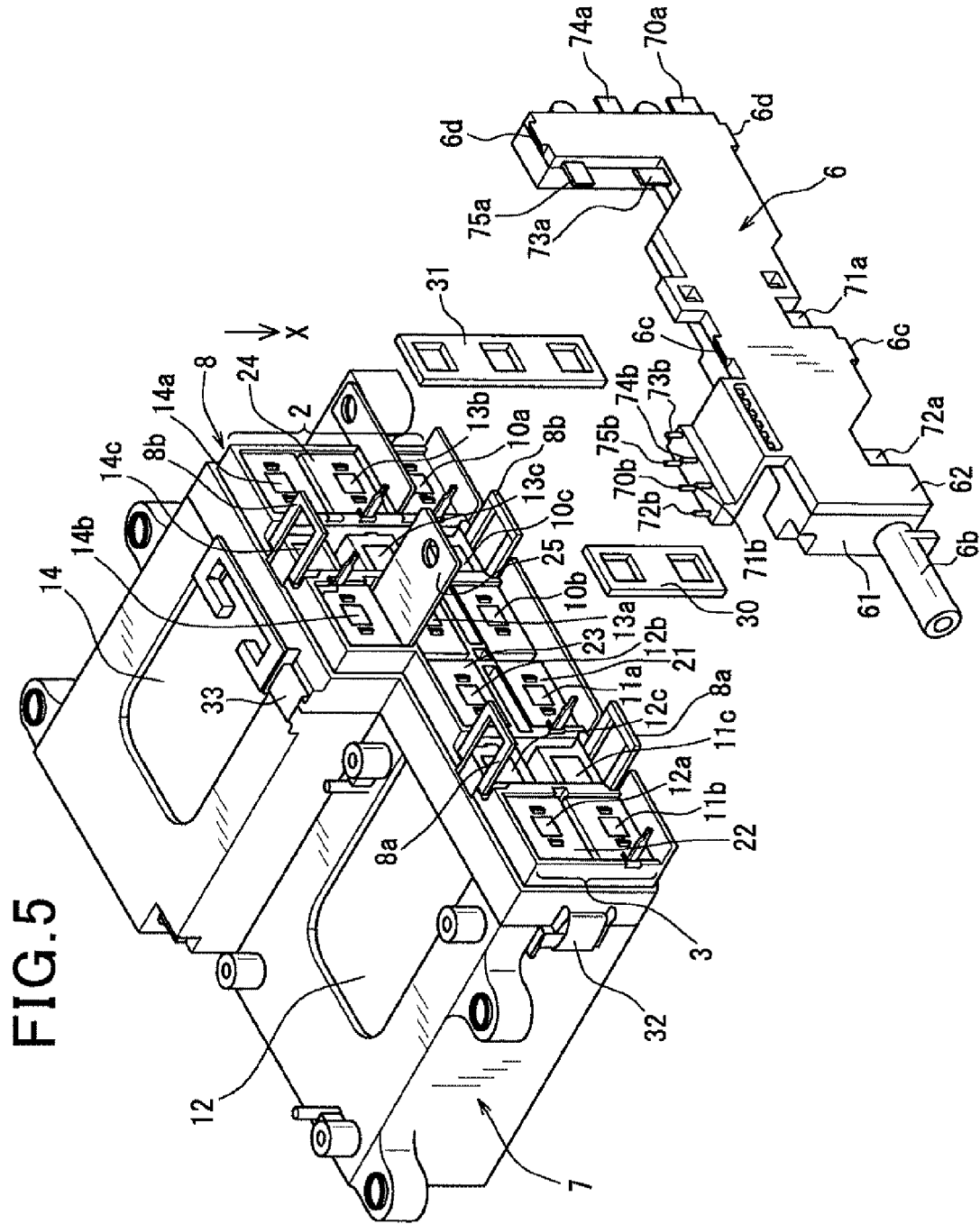
FIG. 5 is an exploded perspective view showing a structure of the assembled battery covered by a battery casing and the discharge duct in the battery unit according to the first exemplary embodiment of the present invention.
Figure 6:
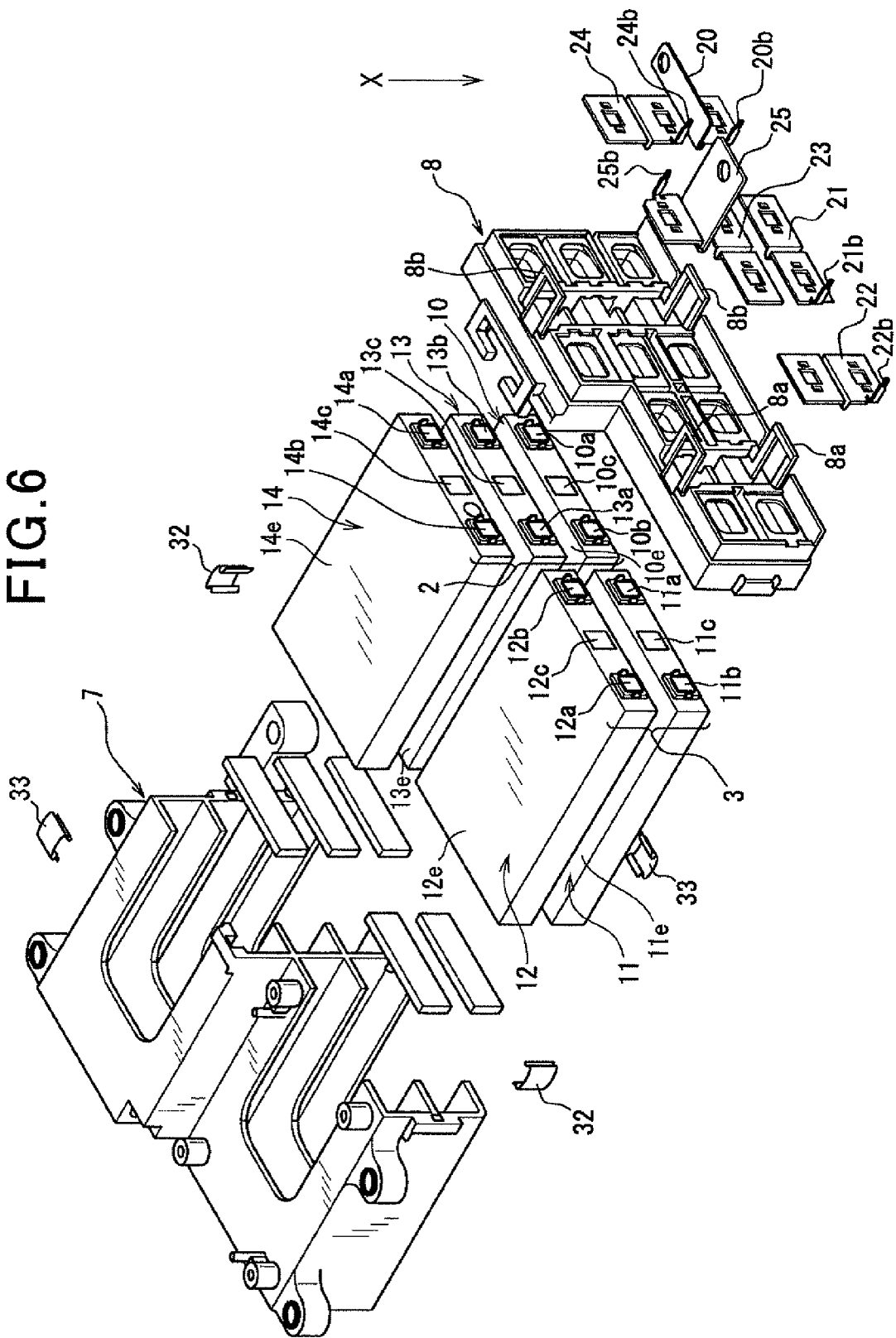
FIG. 6 is an exploded perspective view showing a structure of the assembled battery composed of battery units separated from the battery cover and an insulation cover in the battery unit according to the first exemplary embodiment of the present invention.

FIG. 5 is an exploded perspective view showing a structure of the assembled battery and the discharge duct 6 in the battery unit 1 according to the first exemplary embodiment of the present invention. FIG. 6 is an exploded perspective view showing a structure of the assembled battery having the five battery cells 10, 11, 12, 13 and 14 in the battery unit 1 according to the first exemplary embodiment of the present invention.

Figure 7:
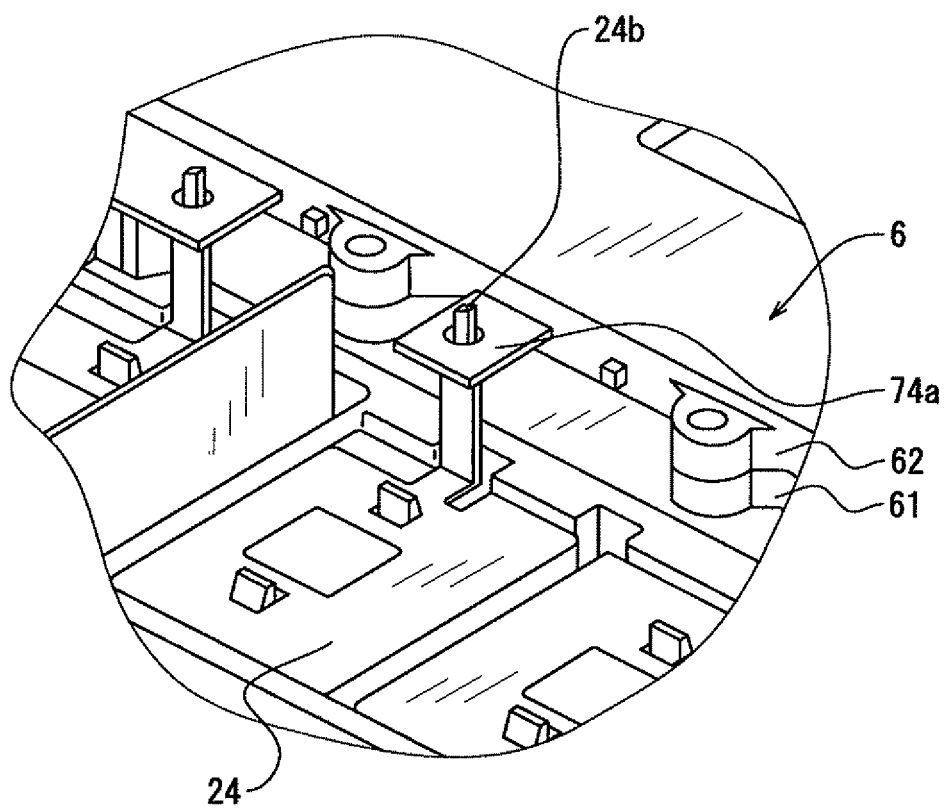
FIG. 7 is an exploded perspective view showing an electric connection between a voltage potential detection terminal of a bus bar and a metal conductive member in the battery unit according to the first exemplary embodiment of the present invention.
Figure 8:
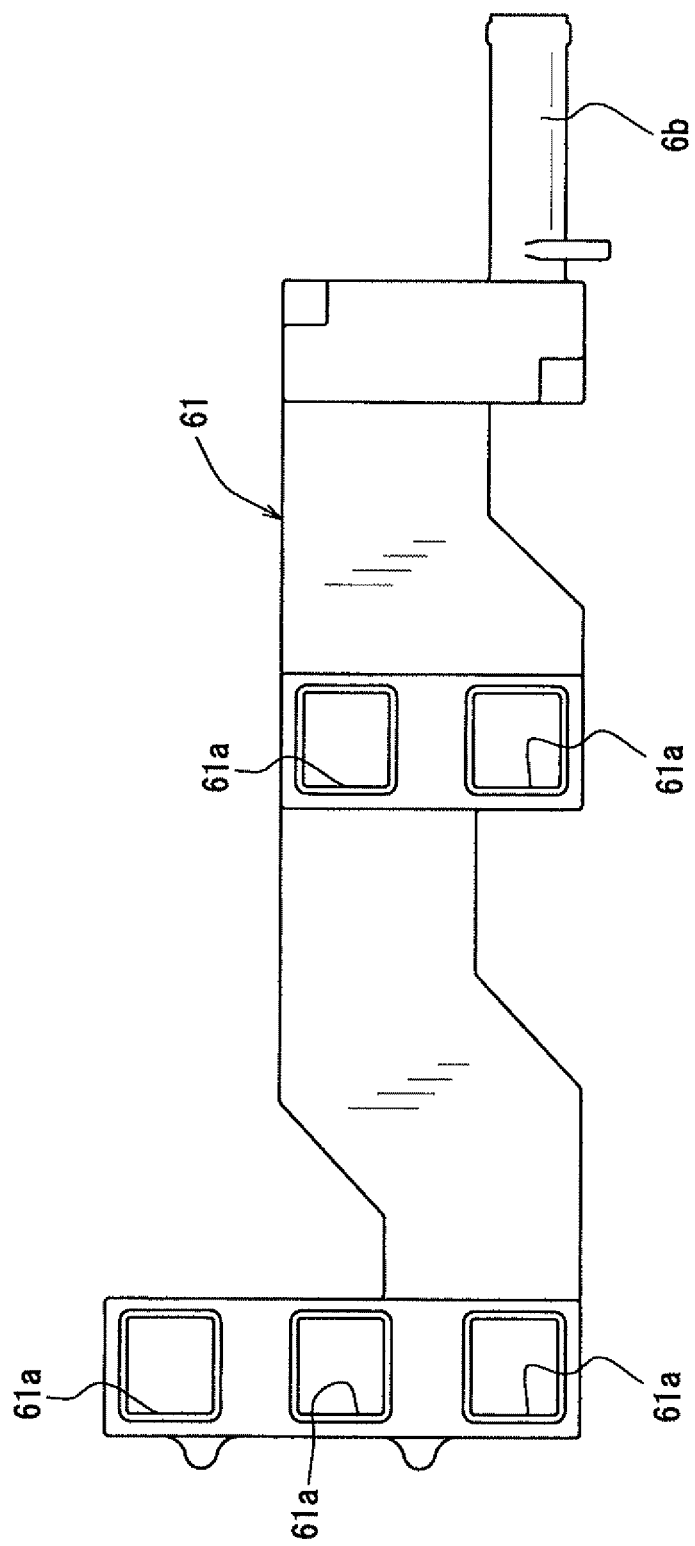
FIG. 8 is a view showing a structure of a first part of the discharge duct used in the battery unit according to the first exemplary embodiment of the present invention.
Figure 9:
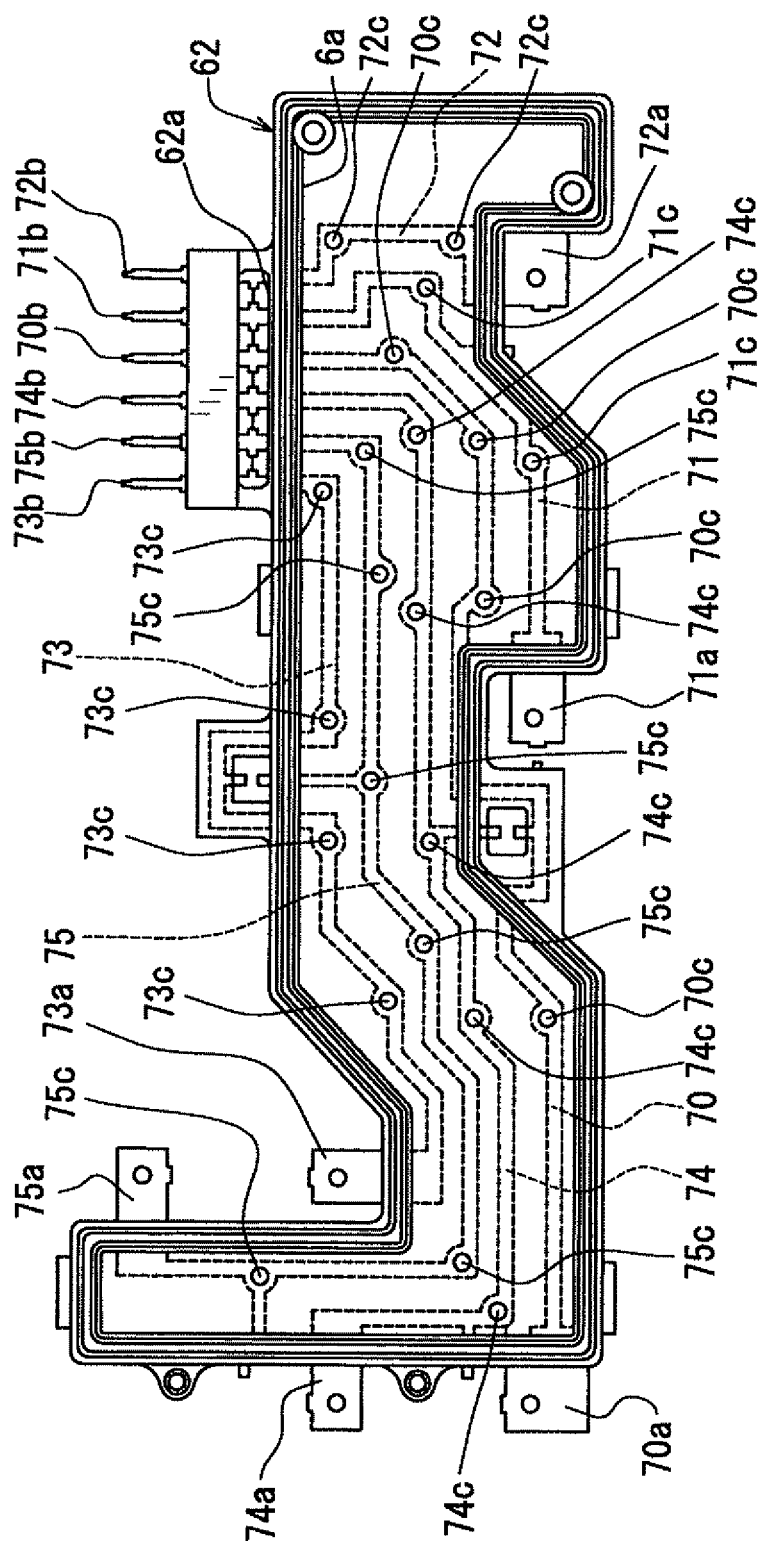
FIG. 9 is a view showing a structure of a second part of the discharge duct which is a remaining part of the first part of the discharge duct used in the battery unit according to the first exemplary embodiment of the present invention.

Further, FIG. 7 is an exploded perspective view showing an electric connection between voltage potential detection terminals of bus bars 20 to 25 and metal conductive members (or metal conductive lines) 70 to 75 in the battery unit 1 according to the first exemplary embodiment of the present invention. FIG. 8 is a view showing a structure of a first part 61 of the discharge duct 6 used in the battery unit 1 according to the first exemplary embodiment. FIG. 9 is a view showing a structure of a second part 62 of the discharge duct 6 which is a remaining part of the first part of the discharge duct 6 used in the battery unit 1 according to the first exemplary embodiment.

Figure 10:
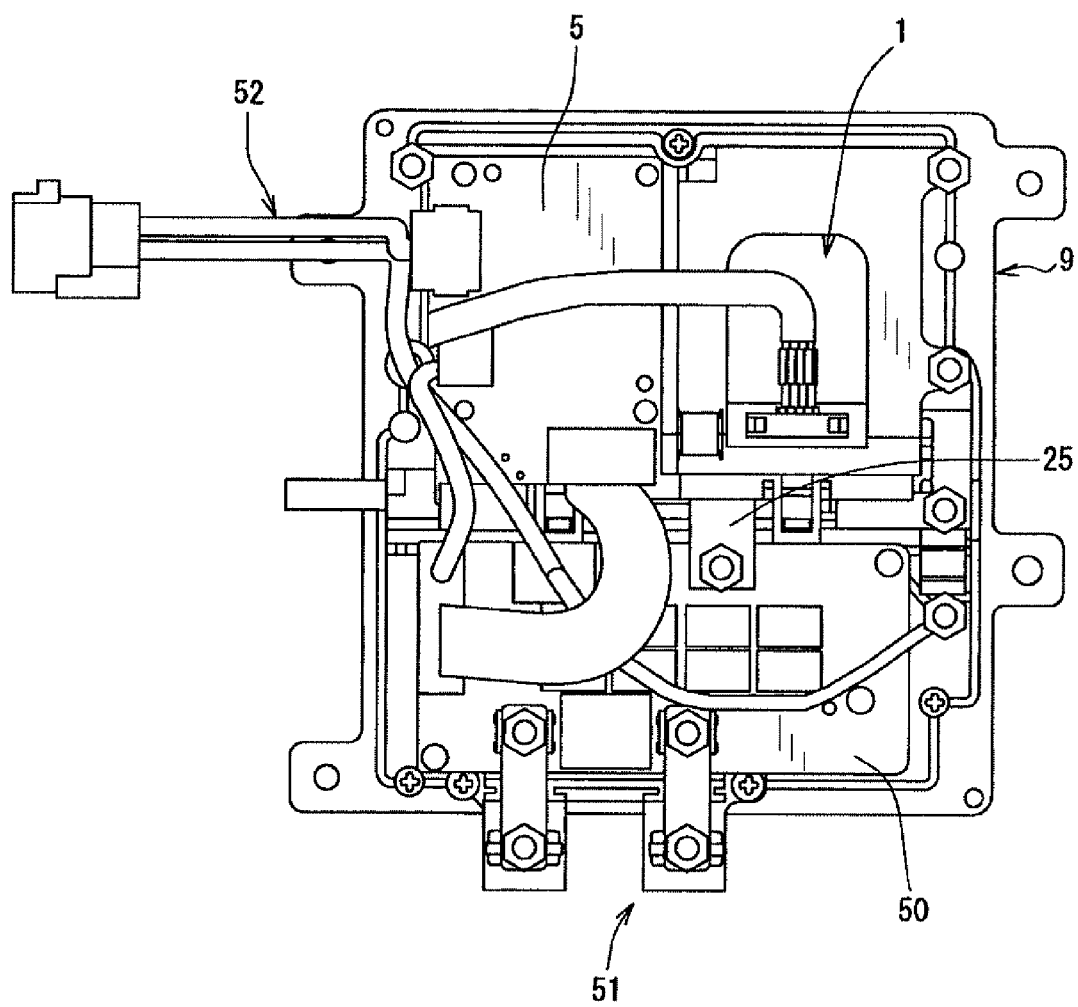
FIG. 10 is a plan view showing a structure in which a cover casing is removed from the battery unit according to the first exemplary embodiment of the present invention.
Figure 11:
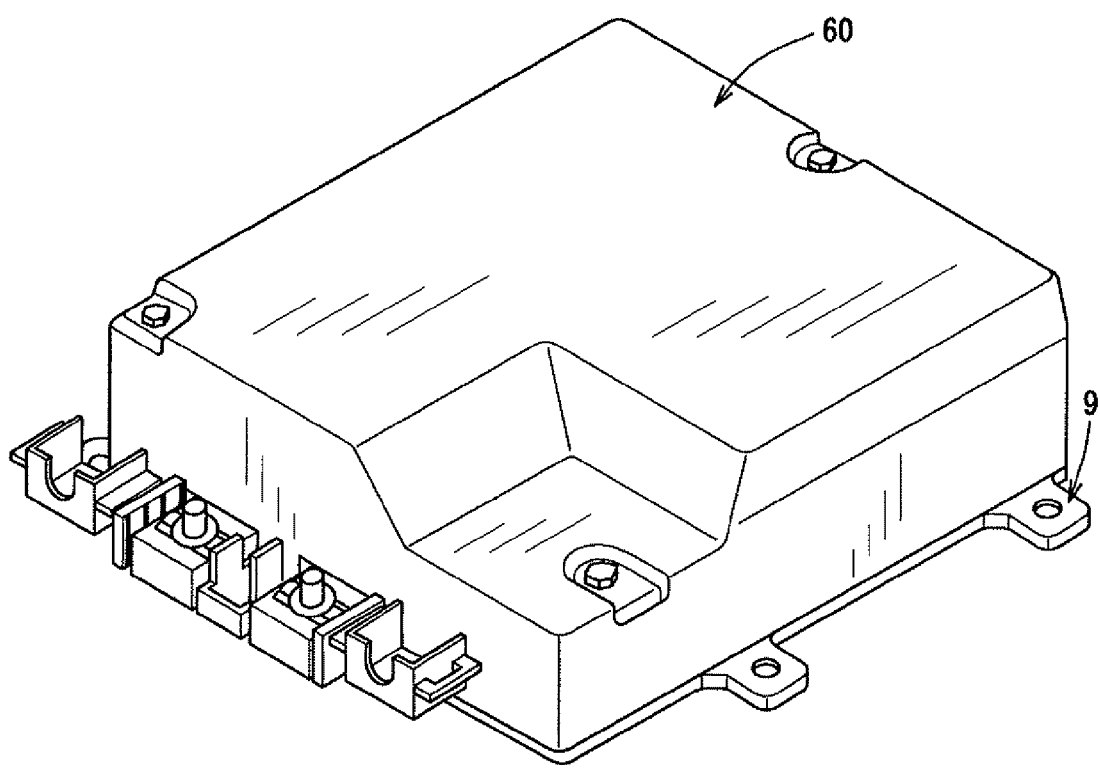
FIG. 11 is a perspective view showing a structure of the battery unit with the cover casing according to the first exemplary embodiment of the present invention.

FIG. 10 is a plan view showing a structure in which a cover casing 60 is removed from the battery unit 1 composed of the assembled battery, the control board 5 and the discharge duct 6 according to the first exemplary embodiment. FIG. 11 is a perspective view showing a structure of the battery unit 1 with the cover casing 60 according to the first exemplary embodiment.

The battery unit 1 (or battery pack) shown in FIG. 11 is mounted to a motor vehicle having an idling stop function. Even if an ignition switch is continuously turned on, the idling stop function temporarily stops the combustion of the engine of the motor vehicle when a traffic signal turns to red and the motor vehicle stops at the traffic signal.

The assembled battery in the battery pack as the battery unit is composed of a plurality of battery cells connected in series through bus bars. Each of the battery cells is a rechargeable battery (or a secondary battery) such as a lithium-ion battery, for example. Thus, the assembled battery is used as an auxiliary battery of a lead-acid battery (or a lead storage battery). For example, a battery unit (or battery pack) is arranged under a front seat in a compartment room of the motor vehicle.

The concept of the battery unit 1 according to the present invention can be applied to hybrid motor vehicles and various type electric vehicles. In general, a hybrid motor vehicle is generally equipped with an internal combustion engine and an electric motor. An electric motor is driven by electric power only supplied from a battery. The electric vehicle is equipped with an electric motor which is driven by electric power supplied from one or more battery packs.

Each of the battery cells 10, 11, 12, 13 and 14 forming the battery unit 1 (battery pack) is a rechargeable battery (or a secondary battery) such as a nickel metal hydride battery, a lithium-ion battery, and an organic radical battery. The battery unit 1 is covered with the cover casing 60 and arranged under the seats in the compartment room of a motor vehicle, or a space between a rear seat and a trunk compartment, or a space between the driver's seat and a front passenger seat of the motor vehicle.

Each of the battery cells 10, 11, 12, 13 and 14 forming the battery unit 1 is covered with an exterior casing 10$e$, 11$e$, 12$e$, 13$e$ or 14$e$. A positive electrode terminal and a negative electrode terminal of each of the battery cells 10, 11, 12, 13 and 14 project from one surface of the corresponding exterior casing 10$e$, 11$e$, 12$e$, 13$e$, 14$e$.

The battery unit 1 has the bus bars 20 to 25 through which the battery cells 10, 11, 12, 13 and 14 are electrically connected in series.

As shown in FIG. 1, the battery unit 1 (battery pack) according to the first exemplary embodiment has the five battery cells 10, 11, 12, 13 and 14.

As shown in FIG. 5 and FIG. 6, each of the battery cells 10, 11, 12, 13 and 14 in the battery unit 1 is stored in the respective position in a battery casing 7 in order to make an assembly of the battery unit 1. The battery casing 7 is a step shaped casing having a stair structure, namely, has a step shaped structure.

As shown in FIG. 1, the five battery cells 10, 11, 12, 13 and 14 are divided into a first stacked group 2 and a second stacked group 3. In each of the first stacked group 2 and the second stacked group 3, the battery cells are stacked along the thickness direction X (or a vertical direction) of the exterior casing 10e, 11e, 12e, 13e or 14e of each battery cell.

In particular, the battery cell 10, the battery cell 13 and the battery cell 14 are stacked along the thickness direction X in order in the first stacked group 2. The battery cell 11 and the battery cell 12 are stacked in order along the thickness direction X in the second stacked group 3. In particular, the battery cells are stacked along the thickness direction X in each of the first stacked group 2 and the second stacked group 3 so that the battery cells face on the maximum surface area thereof to each other.

As shown in FIG. 1, FIG. 3 and FIG. 5, a negative electrode terminal 10a of the battery cell 10 is electrically connected to a bus bar 20. The bus bar 20 is fixed to a body of a motor vehicle by one or more screws. This makes it possible to connect the negative electrode terminal 10a of the battery cell 10 to the ground voltage potential. That is, the negative electrode terminal 10a of the battery cell 10 is earthed or grounded.

One end of the bus bar 20 is extended from the bottom side of the first stacked group 2 toward the side direction of the battery casing 7, namely, extended along the side direction which is perpendicular to the thickness direction X.

A positive electrode terminal 10b of the battery cell 10 is electrically connected to a negative electrode terminal 11a of the battery cell 11 through a bus bar 21.

A positive electrode terminal 11b of the battery cell 11 is electrically connected to a negative electrode terminal 12a of the battery cell 12 through a bus bar 22.

A positive electrode terminal 12b of the battery cell 12 is electrically connected to a negative electrode terminal 13a of the battery cell 13 through a bus bar 23.

A positive electrode terminal 13b of the battery cell 13 is electrically connected to a negative electrode terminal 14a of the battery cell 14 through a bus bar 24.

A positive electrode terminal 14b of the battery cell 14 is electrically connected to a bus bar 25. The bus bar 25 is electrically connected to a power board 50 by one or more screws or by soldering.

As designated by the dotted line shown in FIG. 1, the above electrical connection makes it possible to electrically connect all of the battery cells 10 to 14 in the battery unit 1 (battery pack) in series through the bus bars 20 to 25. A current flow meanders in the battery unit 1 through the electrical connection through the bus bars 20 to 25. In other words, the battery unit 1 according to the first exemplary embodiment has an improved structure in which the bus bars 20 to 25 electrically connect the battery cells 10, 11, 12, 13 and 14 in a vertical direction and a crosswise direction only, do not connect the battery cells 10, 11, 12, 13 and 14 in an oblique direction and a curved direction.

For example, as shown in FIG. 5 and FIG. 6, the exterior casing 10e, 11e, 12e, 13e or 14e of each of the battery cells 10, 11, 12, 13 and 14 is equipped with safety valves. The safety valve is arranged between the positive electrode terminal and the negative electrode terminal in each exterior casing. When an internal pressure of each battery cell exceeds a predetermined pressure value, namely, has an abnormal value, the safety valve is opened. For example, the safety valve is made of a thin metal film. The safety valve is composed of such a thin metal film and a hole which is formed in the exterior casing 10e, 11e, 12e, 13e or 14e of each battery cell. The hole is covered with the thin metal film. When the inside of the battery casing of the battery cell has a gas having a pressure in excess of the thin metal film covering the hole is broken and opened, and the gas is released from, namely, discharged to the outside of the exterior casing 10e, 11e, 12e, 13e or 14e through the hole. This makes it possible to decrease the pressure of the inside of the battery casing of the battery cell. This prevents the battery cell itself from being opened or broken. As shown in FIG. 1, a safety valve 10c of the exterior casing 10e of the battery cell 10, a safety valve 13c of the exterior casing 13e of the battery cell 13, and the safety valve 14c of the exterior casing 14e of the battery cell 14 are arranged along the thickness direction X. Further, the safety valve 11c of the exterior casing 11e of the battery cell 11 and the safety valve 12c of the exterior casing 12e of the battery cell 12 are arranged along the thickness direction X.

In FIG. 6, the battery cells 10, 11, 12, 13 and 14, an insulation cover 8, and the bus bars 20, 21, 22, 23, 24 and 25 are separated from the battery casing 7. The discharge duct 6 (or the passage formation member) is shown in FIG. 5. On the other hand, the discharge duct 6 is omitted from FIG. 6.

As shown in FIG. 5 and FIG. 6, an insulation cover 8 electrically insulates the bus bars 20, 21, 22, 23, 24 and 25 from the exterior casings 10e, 11e, 12e, 13e and 14e of the battery cells 10, 11, 12, 13 and 14. The insulation cover 8 covers one end surface of the exterior casing excepting the safety valves 10c, 11c, 12c, 13c and 14c and electrode terminals.

That is, one end surface of each of the exterior casings 10e, 11e, 12e, 13e and 14e is covered with the insulation cover 8. The insulation cover 8 has a plurality of opening parts.

The opening parts formed in the insulation cover 8 correspond in position to the safety valves 10c, 11c, 12c, 13c and 14c of the exterior casings 10e, 11e, 12e, 13e and 14e, respectively.

When the battery casing 7 equipped with the battery cells 10, 11, 12, 13 and 14, the insulation cover 8 and the bus bars 20, 21, 22, 23, 24 and 25 are assembled, as shown in FIG. 6, the electrode terminal is smaller in size than the corresponding opening part formed in the insulation cover 8.

When the battery cells 10, 11, 12, 13 and 14 stored in the battery casing 7 and the insulation cover 8 are assembled together, each of the safety valves 10c, 11c, 12c, 13c and 14c and the electrode terminals is exposed to the outside of the battery unit 1 (battery pack) through the corresponding opening part.

The insulation cover 8 has a plurality of depression parts in order to execute the positioning of the bus bars 20, 21, 22, 23, 24 and 25 on the insulation cover 8. The number of the depression parts formed in the insulation cover 8 corresponds to the number of the bus bars. That is, in the battery pack 1 according to the first exemplary embodiment, the number of the depression parts is six. An opening part is formed in each of the bus bars 20, 21, 22, 23, 24 and 25, through which an electrode terminal of the battery cell is inserted.

When the bus bar is fitted to the corresponding opening part formed in the insulation cover 8, the electrode terminal is fitted to the opening part of the corresponding bus bar, the positioning between the battery cell and the corresponding bus bar is correctly performed.

When the positioning between the depression parts formed in the insulation cover 8 and the bus bars 20, 21, 22, 23, 24 and 25 is finished, each of the bus bars 20, 21, 22, 23, 24 and 25 is fixed to the insulation cover 8. This makes it possible to easily fix the bus bars 20, 21, 22, 23, 24 and 25 to the insulation cover 8 and to easily fix the electrode terminals to the battery cells 10, 11, 12, 13 and 14 by soldering, etc. with high accuracy. Still further, this makes it possible to prevent the bus bars 20, 21, 22, 23, 24 and 25 from being contacted with other components and to avoid a short circuit between them from being made. This prevents the components of the battery pack 1 from being damaged or broken.

On executing the electrical connection between the electrode terminals to each other through the corresponding bus bar, each of the battery cells 10, 11, 12, 13 and 14 is inserted to the corresponding space in the battery casing 7. Next, the insulation cover 8 is fitted to the battery casing 7 with the battery cells 10, 11, 12, 13 and 14. At this time, the upper part and the bottom part of the battery casing 7 and the insulation cover 8 are tightened together by two clips 33, for example as shown in FIG. 4. Both the right and left sides of the battery casing 7 and the insulation cover 8 are tightened by two clips 32.

Next, the bus bars are fitted to the corresponding depression parts formed in the insulation cover 8. The insulation cover 8 has been assembled together with the battery casing 7 with the battery cells 10, 11, 12, 13 and 14. The electrode terminal has been inserted in the corresponding opening part formed in each of the bus bars. The electrode terminals are fixed to the bus bars by welding such as laser beam welding and arc welding.

The second stacked group 3 stores a smaller number of the battery cells, when compared with the number of the battery cells stacked in the first stacked group 2. That is, the first stacked group 2 stores the three battery cells 10, 13 and 14 which are stacked in order. On the other hand, the second stacked group 3 contains the two battery cells 11 and 12 which are also stacked in order.

The first stacked group 2 and the second stacked group 3 make a stair structure 4 having a step shaped structure, as clearly shown in FIG. 1 and FIG. 3, because there is a difference of the number of the battery cells between the first stacked group 2 and the second stacked group 3.

The control board 5 is omitted from the structure shown in FIG. 3 and FIG. 4.

In the structure of the battery unit 1 (battery pack) according to the first exemplary embodiment, the thickness of the stair structure 4 corresponds approximately to a thickness of one battery cell. As shown in FIG. 1, the control board 5 is arranged on a surface of a lower step part of the stair structure 4. Devices are formed on the surface of the control board 5. The devices detect conditions of the battery cells 10, 11, 12, 13 and 14. For example, these devices mounted on the control board 5 detect a state of each of the battery cells 10, 11, 12, 13 and 14. The stair structure 4, namely, a step shaped structure with the control board 5 makes it possible to suppress the height of the battery unit 1 from being increased in the thickness direction X of the battery unit 1. It is preferable that the upper surface of the control board 5 is arranged below the upper surface of the adjacent first stacked group 2 in view of the thickness direction X of the battery unit 1. The control board 5 is fixed to boss parts formed on the battery casing 7 with the battery cells 10, 11, 12, 13 and 14 by screws.

In the battery unit 1 (battery pack) according to the first exemplary embodiment, a positive electrode terminal 14b of the battery cell 14 having the maximum voltage potential is arranged at the position which is adjacent to the stair structure 4. The power board 50 is electrically connected to a terminal block 51. Through the terminal block 51, the power board 50 is further connected to the control board 5 and a motor vehicle (not shown) equipped with the battery unit 1 according to the first exemplary embodiment. As previously described, all of the battery cells 10, 11, 12, 13 and 14 in the first stacked group 2 and the second stacked group 3 are connected in series through the bus bars 10, 21, 22, 23, 24 and 25.

As shown in FIG. 2, the battery unit 1 (or battery pack) has the discharge duct 6. The safety valves 10c, 11c, 12c, 13c and 14c are exposed to the inside of a discharge passage 6a (or fluid passage) as an inner fluid channel formed in the discharge duct 6.

The discharge duct 6 serves as a duct member which corresponds to a passage forming member used in the battery unit 1 according to the first exemplary embodiment.

The discharge duct 6 is made of material having heat resistance, for example, polyphenylene sulfide (PPS), polybutylene terephthalate resin (PBT), or various types of resin containing heat resistant agent.

The heat resistance of such material prevents the discharge duct 6 from being melted even if a temperature of the inside of the battery cell reaches an extreme high temperature, and a high pressure gas opens or breaks the safety valve and is discharged to the inside of the discharge passage 6a of the discharge duct 6.

It is preferable that the discharge duct 6 is made of resin having a heat resistance at 200° C. for not less than one minute.

This feature of the discharge duct 6 prevents the control board 5 and the power board 50, etc. from being damaged by high temperature gas, electrolyte solution, etc.

The insulation cover 8 has an electric insulation capability, and is made of plastic (synthetic resin) such as polypropylene resin (PP resin), polypropylene resin (PP resin) containing filler or talc, for example.

It is preferable for the insulation cover 8 to be made of heat resistant resin like the discharge duct 6.

The discharge duct 6 has a cylindrical shape extending along a lateral or a horizontal direction of the battery unit 1. The lateral direction is perpendicular to the thickness direction X of the battery unit 1.

When the discharge duct 6 is assembled with the insulation cover 8, the opening parts formed in the discharge duct 6 are larger in size than the corresponding safety valves 10c, 11c, 12c, 13c and 14c.

An outer periphery edge part of the opening part formed in the discharge duct 6 is adhered to the surface of the exterior casings 10e, 11e, 12e, 13e and 14e around the safety valves 10c, 11c, 12c, 13c and 14c through packing members 30 and 31 when the discharge duct 6 is assembled with the insulation cover 8. In other words, the packing members 30 and 31 are sandwiched between the discharge duct 6 and the insulation cover 8.

To use the packing members 30 and 31 can increase the air tightness between the discharge duct 6 and the insulation cover 8 when discharge duct 6 and the insulation cover 8 are assembled.

The opening parts formed in the discharge duct 6 correspond to fluid inlets 61a (see FIG. 8) through which gas discharged from a battery cell in battery fault is introduced into the inside of the discharge passage 6a of the discharge duct 6.

The discharge duct 6 has an introduction duct part 6b which communicates with the discharge passage 6a (or the fluid passage) to form an inside passage extending from a side part to the outside of the discharge duct 6, as shown in FIG. 2, FIG. 3, FIG. 4 and FIG. 5.

Through the introduction duct part 6b, gas can be emitted to the discharge passage 6a and to outside the battery unit 1 (battery pack).

It is possible to use soft resin such as elastomer by double mold instead of using the packing members 30 and 31 in order to push and fix the peripheral part of the safety valves 10c, 11c, 12c, 13c and 14c in the discharge duct 6.

The metal conductive members (or metal conductive lines) 70, 71, 72, 73, 74 and 75 are integrated with the discharge duct 6 by insert molding. That is, the metal conductive members 70, 71, 72, 73, 74 and 75 are not dedicated components in the battery unit, namely, not independent from other components in the battery unit because the metal conductive members (or metal conductive lines) 70, 71, 72, 73, 74 and 75 are integrated to the second part 62 in the discharge duct 6 or the casing body 60 or the battery casing 7 (which will be explained later).

The discharge duct 6 is obtained by integrating a plurality of parts. For example, the first exemplary embodiment uses a first part 61 and a second part 62 and they are assembled to make the discharge duct 6.

As can be understood from FIG. 5, the first part 61 and the second part 62 are separately prepared, and the first part 61 and the second part 62 are assembled together.

FIG. 8 is a view showing a structure of the first part 61 of the discharge duct 6, when observed from the assembled battery composed of the battery cells 10, 11, 12, 13 and 14, in the battery unit 1 according to the first exemplary embodiment. FIG. 9 is a view showing a structure of the second part 62 of the discharge duct 6, when observed from the assembled battery composed of the battery cells 10, 11, 12, 13 and 14, in the battery unit 1 according to the first exemplary embodiment.

As shown in FIG. 8, all the fluid inlets 61a are formed in the first part 61. Further, as shown in FIG. 9, the metal conductive members 70, 71, 72, 73 and 74 are formed in the second part 62 of the discharge duct 6 by insert molding. In other words, all the metal conductive members 70, 71, 72, 73 and 74 are integrated to the second part 62 of the discharge duct 6 by insert molding. A cross section of each of the metal conductive members 70, 71, 72, 73 and 74 has a rectangular conductive member of a rectangle shape made of copper plate having a superior conductivity by punching process.

As shown in FIG. 9, one end part of the metal conductive member 70, which projects from the second part 62 of the discharge duct 6, becomes a connection terminal 70a which is electrically connected to a voltage potential detection terminal (or a voltage detection terminal) 20b formed on the bus bar 20.

The other end part of the metal conductive member 70, which projects from the second part 62 of the discharge duct 6, becomes a connection terminal 70b which is electrically connected to a voltage detection circuit formed on the control board 5.

Further, one end part of the metal conductive member 71, which projects from the second part 62 of the discharge duct 6, becomes a connection terminal 71a which is electrically connected to a voltage potential detection terminal (or a voltage detection terminal) 21b formed on the bus bar 21.

The other end part of the metal conductive member 71, which projects from the second part 62 of the discharge duct 6, becomes a connection terminal 71b which is electrically connected to the voltage detection circuit formed on the control board 5.

Still further, one end part of the metal conductive member 72, which projects from the second part 62 of the discharge duct 6, becomes a connection terminal 72a which is electrically connected to a voltage potential detection terminal (or a voltage detection terminal) 22b formed on the bus bar 22.

The other end part of the metal conductive member 72, which projects from the second part 62 of the discharge duct 6, becomes a connection terminal 72b which is electrically connected to the voltage detection circuit formed on the control board 5.

Further, one end part of the metal conductive member 73, which projects from the second part 62 of the discharge duct 6, becomes a connection terminal 73a which is electrically connected to a voltage potential detection terminal (or a voltage detection terminal) 23b formed on the bus bar 23

The other end part of the metal conductive member 73, which projects from the second part 62 of the discharge duct 6, becomes a connection terminal 73b which is electrically connected to the voltage detection circuit formed on the control board 5.

Still further, one end part of the metal conductive member 74, which projects from the second part 62 of the discharge duct 6, becomes a connection terminal 74a which is electrically connected to a voltage potential detection terminal (or a voltage detection terminal) 24b formed on the bus bar 24.

The other end part of the metal conductive member 74, which projects from the second part 62 of the discharge duct 6, becomes a connection terminal 74b which is electrically connected to the voltage detection circuit formed on the control board 5.

One end part of the metal conductive member 75, which projects from the second part 62 of the discharge duct 6, becomes a connection terminal 75a which is electrically connected to a voltage potential detection terminal (or a voltage detection terminal) 25b formed on the bus bar 25.

The other end part of the metal conductive member 75, which projects from the second part 62 of the discharge duct 6, becomes a connection terminal 75b which is electrically connected to the voltage detection circuit formed on the control board 5.

FIG. 7 shows an example of the electrical connection between the connection terminal 74a of the metal conductive member 74 and the voltage potential detection terminal (or a voltage detection terminal) 24b formed on the bus bar 24.

Like the electrical connection shown in FIG. 7, the voltage potential detection terminals (or voltage detection terminals) 20b, 21b, 22b, 23b, 24b and 25b of the bus bars 20, 21, 22, 23, 24 and 25 are inserted into and fixed to the corresponding holes formed in the connection terminals 70a, 71a, 72a, 73a, 74a and 75a by soldering, etc. These connection terminals 70a, 71a, 72a, 73a, 74a and 75a are formed in one end part of the metal conductive members 70, 71, 72, 73, 74 and 75, respectively, shown in FIG. 9.

It is possible to use welding, fastening with glue, and screws instead of soldering in order to connect the voltage potential detection terminals (or voltage detection terminals) 20b, 21b, 22b, 23b, 24b and 25b of the bus bars 20, 21, 22, 23, 24 and 25 and the connection terminals 70a, 71a, 72a, 73a, 74a and 75a of the metal conductive members 70, 71, 72, 73, 74 and 75.

Although it is possible to use using pressure welding in order to connect the voltage potential detection terminals (or voltage detection terminals) 20b, 21b, 22b, 23b, 24b and 25b of the bus bars 20, 21, 22, 23, 24 and 25 to the connection terminals 70a, 71a, 72a, 73a, 74a and 75a of the metal conductive members 70, 71, 72, 73, 74 and 75, it is preferred to use soldering, fastening with glue and screws, instead of using pressure welding in order to avoid influence from vibration and to keep mechanical and electrical connection reliability between them because the battery unit 1 (battery pack) is mounted in general to a motor vehicle.

Each of the connection terminals 70*b*, 71*b*, 72*b*, 73*b*, 74*b* and 75*b* at the other end of each of the metal conductive members 70, 71, 72, 73, 74 and 75 is inserted into and fixed to a corresponding through hone formed in the control board 5 by soldering. This makes it possible to electrically connect the connection terminals 70*b*, 71*b*, 72*b*, 73*b*, 74*b* and 75*b* of the metal conductive members 70, 71, 72, 73, 74 and 75 to the voltage detection circuit in the control board 5.

However, the concept of the present invention is not limited by this method. It is possible to use other methods such as welding, fastening with glue and screws instead of using soldering.

Although it is also possible to use pressure welding in order to connect the connection terminals 70*b*, 71*b*, 72*b*, 73*b*, 74*b* and 75*b* of the metal conductive members 70, 71, 72, 73, 74 and 75 to the control board 5 (namely, to the voltage detection circuit), it is preferable to use soldering, fastening with glue and screws, instead of using pressure welding in order to avoid influence from vibration and to keep mechanical and electrical connection reliability between them because the battery unit 1 (battery pack) is mounted in general to a motor vehicle.

A surface treatment of tin plating or nickel plating has been done on a surface of at least each of the connection terminals 70*a*, 71*a*, 72*a*, 73*a*, 74*a* and 75*a* and the connection terminals 70*b*, 71*b*, 72*b*, 73*b*, 74*b* and 75*b* of the metal conductive members 70, 71, 72, 73, 74 and 75.

Such a surface treatment makes it possible to maintain the reliability of the electrical connection between them for a long period of time and to provide a stably voltage detection.

Each of the metal conductive members 70, 71, 72, 73, 74 and 75 are connected together through connection members (omitted from FIG. 9), and the entire of the metal conductive members 70, 71, 72, 73, 74 and 75 are integrated with the second part 62 of the discharge duct 6 by insert molding. After such an insert molding, the connection part between the metal conductive members 70, 71, 72, 73, 74 and 75 is removed by pressing in order to electrically separate the metal conductive members 70, 71, 72, 73, 74 and 75 from each other. This makes each voltage potential transmission line through which a voltage potential of each battery cell is transmitted to the voltage detection circuit formed on the control board 5.

As shown in FIG. 9, each of the metal conductive members 70, 71, 72, 73, 74 and 75 is approximately extended in a direction along which the discharge passage 6*a* in the discharge duct 6 is extended. As shown in FIG. 9, a part of each of the metal conductive members 70, 71, 72, 73, 74 and 75 is exposed from the second part 62 of the discharge duct 6 through exposed parts 70*c*, 71*c*, 72*c*, 73*c* and 74*c* so that such a part faces the discharge passage 6*a* in the discharge duct 6.

Each of the exposed parts 70*c*, 71*c*, 72*c*, 73*c* and 74*c* of the metal conductive members 70, 71, 72, 73, 74 and 75 has a circular shape. As shown in FIG. 9, these exposed parts between the adjacent metal conductive members are arranged relatively close to each other.

As shown at the upper right side in FIG. 9, each of the connection terminals 70*b*, 71*b*, 72*b*, 73*b*, 74*b* and 75*b* of the metal conductive members 70, 71, 72, 73, 74 and 75 is projected toward the upper side so that they are separated from the discharge passage 6*a* in the discharge duct 6.

As shown in FIG. 2, when the cover casing 60 is removed from the battery unit 1 (battery pack), the connection parts between the control board 5 and the connection terminals 70*b*, 71*b*, 72*b*, 73*b*, 74*b* and 75*b* of the metal conductive members 70, 71, 72, 73, 74 and 75 are visualized, namely, can be easily monitor the connection state of soldering between them.

The second part 62 of the discharge duct 6 in the discharge duct 6 has a window part 62*a*. The window part 62*a* is formed under the connection terminals 70*b*, 71*b*, 72*b*, 73*b*, 74*b* and 75*b* of the metal conductive members 70, 71, 72, 73, 74 and 75, and separated from the discharge passage 6*a* in the discharge duct 6. Through the window part 62*a*, a part of each of the metal conductive members 70, 71, 72, 73, 74 and 75 is exposed. Because the metal conductive members 70, 71, 72, 73, 74 and 75 exposed through the window part 62*a* are arranged at a constant interval, it is possible to detect the connection state of each of the metal conductive members 70, 71, 72, 73, 74 and 75 by using a tester.

As shown in FIG. 5, the discharge duct 6 has claw parts 6*c* which protrude towards outside at an upper side and a bottom side in the thickness direction X (in a vertical direction) at a center part in a lateral direction of the discharge duct 6. Further, the discharge duct 6 has claw parts 6*d* which protrude towards outside at the upper side and the bottom side in the thickness direction X at a side part in the lateral direction of the discharge duct 6.

On the other hand, the insulation cover 8 has two engagement parts 8*a*. Each of the engagement parts 8*a* has a hole part. The hole part of each engagement part 8*a* is fitted with the corresponding claw part 6*c*. The insulation cover 8 further has two engagement parts 8*b*. Each of the engagement parts 8*a* has a hole part. The hole part of each engagement part 8*b* is fitted with the corresponding claw part 6*d*.

When the discharge duct 6 is assembled with the insulation cover 8, each of the two claw parts 6*c* in the discharge duct 6 is fitted to the corresponding engagement part 8*a* in the insulation cover 8, and each of the two claw parts 6*d* in the discharge duct 6 is fitted to the corresponding engagement part 8*b* in the insulation cover 8. This structure fixes the discharge duct 6 to the insulation cover 8 and prevents the discharge duct 6 from being moved. Further, when the discharge duct 6 is assembled with the insulation cover 8, this structure makes it possible to press the packing parts 30 and 31 so that the discharge duct 6 is pushed toward the insulation cover 8. That is, this makes it possible to increase the sealing between the surface of each of the safety valves 10*c*, 11*c*, 12*c*, 13*c* and 14*c* and the discharge passage 6*a* in the discharge duct 6.

As shown in FIG. 10 and FIG. 11, the main components such as the battery pack 1, the power board 50 and the terminal block 51 are mounted on the floor plate 9. The main components of the battery unit 1 (or battery pack) are power board 50, and the terminal block 51. The control board 5 is mounted on and fixed to the battery unit 1. For example, in order to increase the strength of the floor plate 9, the floor plate 9 is made of polypropylene (PP) or plastic of polypropylene containing filler or talc having an electric insulation capability.

The floor plate 9 has fixing parts and mounting parts. The floor plate 9 is fixed to a motor vehicle (omitted from drawings) through the fixing parts by bolts. The battery unit 1, etc. is covered with the cover casing 60. The cover casing 60 is fixed to floor plate 9 by using packing members and bolts.

A battery monitor device is an electric control unit (ECU) which monitors the state of the battery unit 1. The battery monitor device is electrically connected to the battery unit 1 through detection wires extended from detection terminals of the battery unit 1. The detection wires are communication lines to transmit information regarding a voltage, a temperature, etc. of the battery pack 1 to the ECU as the battery monitor device. The detection terminals contain various type sensors such as a voltage detection element, a temperature sensor, and other detection sensors.

The battery unit 1 (battery pack) is equipped with various electronic components which are capable of monitoring charging, discharging and temperature of each of the battery cells 10, 11, 12, 13 and 14.

Those electronic components are, for example, a direct current to direct current (DC/DC) converter, inverters, power elements mounted on the power board 50, electronic components mounted to the control board 5, various types of electronic control devices.

Further, the battery unit 1 has the battery monitor device, as previously described, a control device and a wire harness of wires. As previously described, the battery monitor device receives various type detection signals transferred from various type sensors which detect a voltage and a temperature of each battery cell. The control device communicates with the battery monitor device and controls electric power transmission to the DC/DC converter. The control device controls the operation of motors of one or more electric fans. Those devices in the battery unit 1 are electrically connected through the wires of the wire harness. It is possible for the battery unit 1 to have an air blower to cool each of the battery cells.

In the structure of the battery unit 1 (or battery pack) according to the first exemplary embodiment previously described, the voltage potential detection terminals (or voltage detection terminals) 20*b*, 21*b*, 22*b*, 23*b*, 24*b* and 25*b* of the bus bars 20, 21, 22, 23, 24 and 25 are electrically connected to the voltage detection circuit mounted on the control board 5 through the metal conductive members 70, 71, 72, 73, 74 and 75. Further, the metal conductive members 70, 71, 72, 73, 74 and 75 are integrated with the discharge duct 6 as one body by insert molding. That is, the metal conductive members 70, 71, 72, 73, 74 and 75 are integrated with the discharge duct 6 to form one body. The improved structure of the battery unit 1 previously described makes it possible to avoid any additional components for supporting the metal conductive members 70, 71, 72, 73, 74 and 75. This makes it possible to provide the battery unit 1 (or battery pack) with a simple structure.

Further, the metal conductive members 70, 71, 72, 73, 74 and 75 are integrated with the second part 62, not integrated with the first part 61, in the discharge duct 6 by insert molding.

This structure makes it possible to avoid any conductive member from being formed in the first part 61, which faces the assembled battery cells 10, 11, 12, 13 and 14 side and at which the fluid inlets 61*a* (shown in FIG. 8) of the discharge duct 6.

Accordingly, it is not necessary to arrange the conductive members such as the metal conductive members 70, 71, 72, 73, 74 and 75 so that the conductive members bypass the fluid inlets 61*a* (see FIG. 8) in the first part 61 of the discharge duct 6. It is possible to arrange the metal conductive members 70, 71, 72, 73, 74 and 75 in the second part 62 of the discharge duct 6 with an adequate margin.

In the structure of the battery unit 1 (or battery pack) according to the first exemplary embodiment previously described, the exposed parts 70*c*, 71*c*, 72*c*, 73*c* and 74*c* are formed in the second part 62 of the discharge duct 6 so that a part of each of the metal conductive members 70, 71, 72, 73, 74 and 75 is exposed to the inside of the discharge passage 6*a* in the discharge duct 6 through the exposed parts 70*c*, 71*c*, 72*c*, 73*c* and 74*c*.

When the internal pressure of a battery cell exceeds a predetermined pressure and the safety valve of this battery cell is opened, gas and electrolyte solution are discharged from the inside of the battery cell into the discharge passage 6*a* in the discharge duct 6 through the opened safety valve. When such gas and electrolyte solution discharged from the battery cell in battery fault are contacted with one more the metal conductive members, the metal conductive member is deteriorated and the electric resistance of the metal conductive member is changed. When such gas and electrolyte solution are contacted with some of the metal conductive members 70, 71, 72, 73, 74 and 75 and a short circuit is made between the metal conductive members 70, 71, 72, 73, 74 and 75, an output of the voltage detection circuit formed on the control board 5 is significantly changed.

Accordingly, even if an electrode voltage potential of each battery cell is not significantly changed when at least one of the safety valves 10*c*, 11*c*, 12*c*, 13*c* and 14*c* of the battery cells 10, 11, 12, 13 and 14 is opened under battery fault, the voltage control circuit formed on the control board 5 can detect an occurrence of the battery fault of the battery cell.

That is, the battery unit 1 according to the first exemplary embodiment can simultaneously detect (a) occurrence of an abnormal state of a battery cell on the basis of the voltage potential information transmitted through the metal conductive member and the electrode terminal of the battery cell, and (b) occurrence of an abnormal state of a battery cell on the basis of a change of the voltage potential caused when electrolyte solution discharged from the battery cell through the safety valve is contacted with an exposed surface of the metal conductive member.

Accordingly, when if one of the detection processes (a) and (B) previously described does not detect occurrence of an abnormal state of the batter cell, it is possible for the another detection method to detect the occurrence of an abnormal state of the battery cell. The battery unit 1 (or battery pack) according to the first exemplary embodiment can detect occurrence of an abnormal state of a battery cell by using the two detection processes.

Second Embodiment

A description will be given of a battery unit 1-1 (or battery pack) according to a second exemplary embodiment of the present invention with reference to FIG. 12 and FIG. 13.

Figure 12:
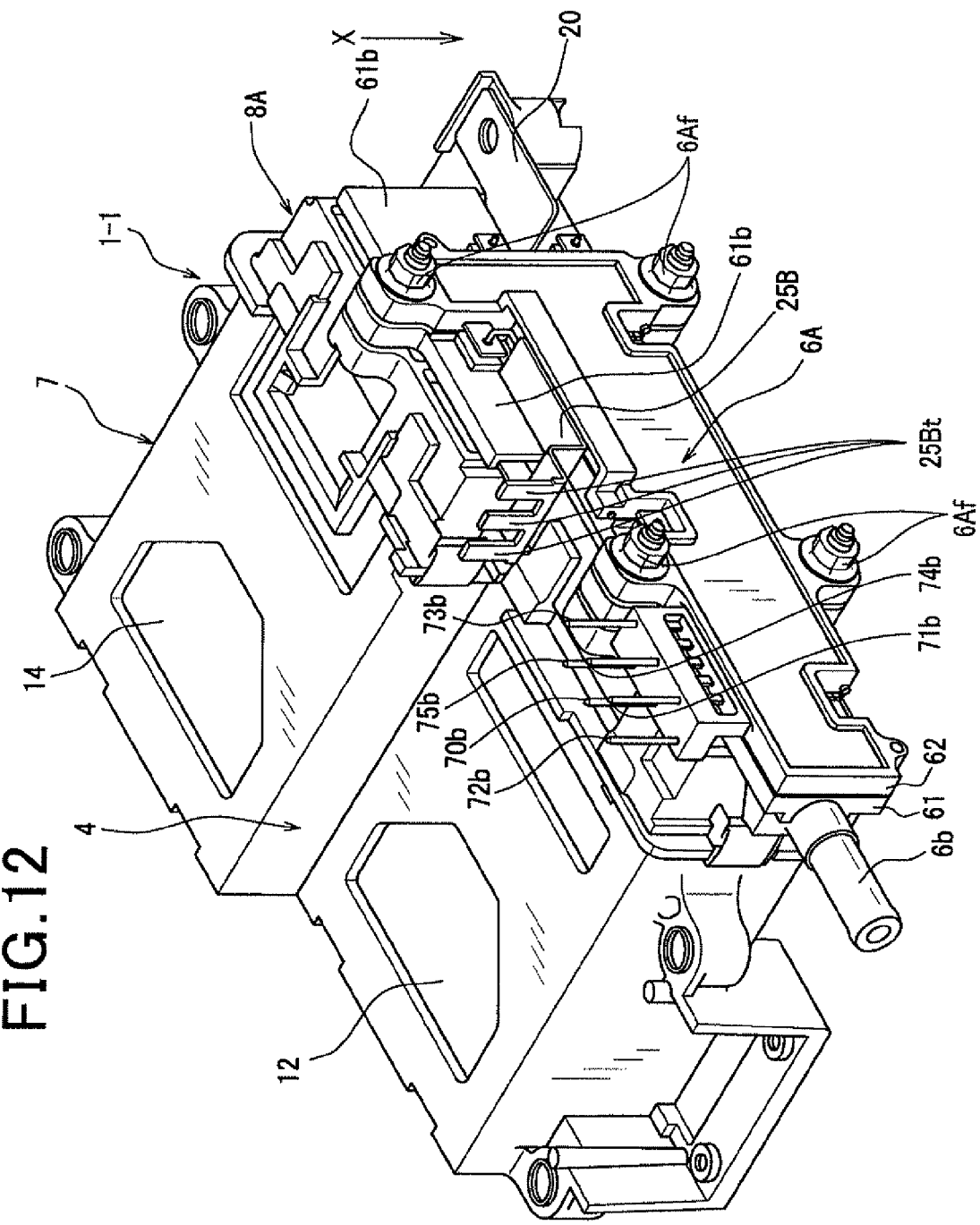
FIG. 12 is a perspective view showing an arrangement of the assembled battery and the discharge duct in the battery unit according to a second exemplary embodiment of the present invention.

FIG. 12 is a perspective view showing an arrangement of the assembled battery and a discharge duct 6A (or a passage formation member) in the battery unit 1-1 according to a second exemplary embodiment of the present invention. FIG. 13 is a plan view showing a structure in which the cover casing 60 is removed from the battery unit 1-1 according to the second exemplary embodiment of the present invention.

The same components between the second exemplary embodiment and the first exemplary embodiment will be referred with the same reference characters and numbers. The explanation of the same components between the second exemplary embodiment and the first exemplary embodiment is omitted here for brevity.

Figure 13:
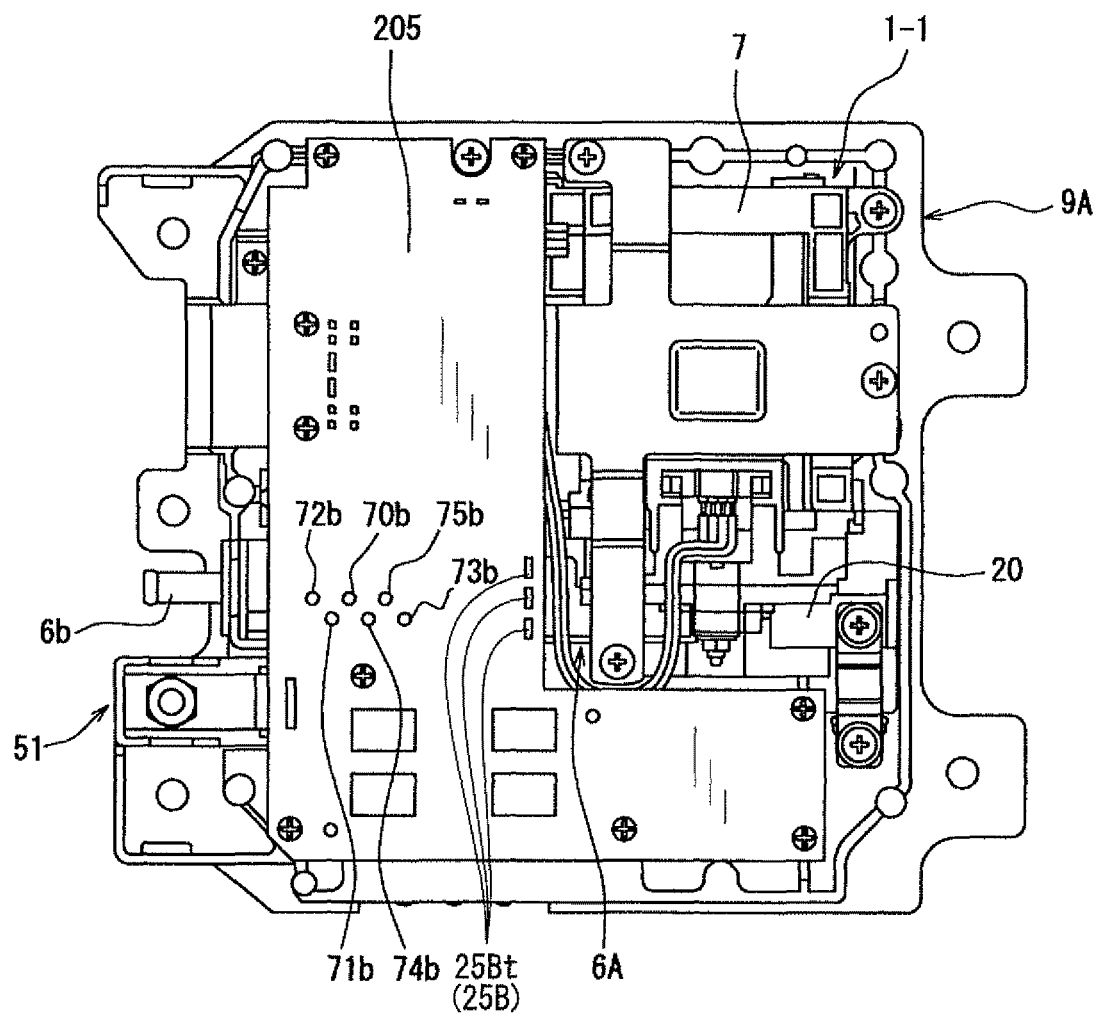
FIG. 13 is a plan view showing a structure in which the cover casing is removed from the battery unit according to the second exemplary embodiment of the present invention.

The battery pack 1-1 according to the third exemplary embodiment shown in FIG. 12 and FIG. 13 has a control board 205 on which the control board 5 and the power board 50 are mounted.

As shown in FIG. 12 and FIG. 13, the control board 205 is electrically connected to both the bus bar 25B and the connection terminals 70*b*, 71*b*, 72*b*, 73*b*, 74*b* and 75*b* of the metal conductive members 70, 71, 72, 73, 74 and 75.

As shown in FIG. 12, the bus bar 25B has three terminals 25Bt extending toward the upper direction, namely, toward the thickness direction X of the battery unit 1-1 from the control board 205 in the stair structure 4. The stair structure has been described in the first exemplary embodiment. The control board 205 is omitted from FIG. 12.

As shown in FIG. 13, the three terminals 25Bt are electrically connected to predetermined terminals of the control board 205. The connection terminals 70b, 71b, 72b, 73b, 74b and 75b of the metal conductive members 70, 71, 72, 73, 74 and 75 extending from the stair structure 4 toward the upper direction, namely, toward the thickness direction X of the battery pack 1-1 is electrically connected to the voltage detection circuit formed on the control board 205 arranged on the lower step in the stair structure 4.

As shown in FIG. 12, the discharge duct 6A having four fixing parts 6Af. The two fixing parts 6Af are formed at the upper part and the bottom part of a center part of the discharge duct 6A. The other two fixing parts 6Af are formed at the upper part and the bottom part of one end part along a longitudinal direction of the fixing parts 6Af. The discharge duct 6A is fixed to an insulation cover 8A through the four fixing parts 6Af by using bolts and nuts as fixing members.

The discharge duct 6A is forcedly pushed and fastened to the insulation cover 8A and the packing members 30 and 31 are compressed by the bolts and nuts as the fixing members. This makes it possible to increase the air tightness between the surface of each of the safety valves 10c, 11c, 12c, 13c and 14c and the discharge passage 6a (or the fluid passage).

A cover part 61b having an approximate plate shape is formed in the first part 61 of the discharge duct 6A. The electrode terminals of the battery cells and the bus bars in the battery unit 1-1 are covered with the cover part 61b. The cover part 61b prevents water and foreign matter from being entered into and adhered on the electrode terminals of the battery cells and bus bars.

As shown in FIG. 13, main components such as the battery pack 1-1, the power board 50 and the terminal block 51 are arranged on and fixed to the floor plate 9A. The control board 205 is mounted on and fixed to the battery pack 1-1. The floor plate 9a supports the battery pack 1-1, the power board 50, the terminal block 51, etc. as the main components of the battery pack 1.

The floor plate 9A having the battery pack 1-1 is covered and packed with the cover casing 60. This makes it possible to easily and safely mount the battery pack to a motor vehicle.

(Other Modifications)

The concept of the present invention is not limited by the structures of the battery packs 1 and 1-1 according to the first exemplary embodiment and the second exemplary embodiment previously described.

The first exemplary embodiment and the second exemplary embodiment use the metal conductive members 70, 71, 72, 73, 74 and 75. However, the concept of the present invention is not limited by the structures of the battery packs 1 and 1-1 according to the first and second exemplary embodiments previously described. It is possible to use metal conductive members 70, 71, 72, 73, 74 and 75 as electrical conductive members made of carbon.

The first exemplary embodiment and the second exemplary embodiment have the structure in which the connection terminals 70a, 71a, 72a, 73a, 74a and 75a of the metal conductive members 70, 71, 72, 73, 74 and 75 are electrically connected to the voltage potential detection terminals (or voltage detection terminals) 20b, 21b, 22b, 23b, 24b and 25b of the bus bars 20, 21, 22, 23, 24 and 25, respectively.

However, the concept of the present invention is not limited by the structures of the battery packs 1 and 1-1 according to the first exemplary embodiment and the second exemplary embodiment previously described. For example, it is possible to directly connect the connection terminals 70a, 71a, 72a, 73a, 74a and 75a of the metal conductive members 70, 71, 72, 73, 74 and 75 to the electrode terminals of the battery cells.

The first exemplary embodiment and the second exemplary embodiment have the structure in which the connection terminals 70b, 71b, 72b, 73b, 74b and 75b of the metal conductive members 70, 71, 72, 73, 74 and 75 are electrically connected to the single control board. However, the concept of the present invention is not limited by the structures of the battery packs 1 and 1-1 according to the first and second exemplary embodiments previously described.

For example, it is possible to connect the connection terminals 70b, 71b, 72b, 73b, 74b and 75b of the metal conductive members 70, 71, 72, 73, 74 and 75 are electrically connected to various control boards. That is, it is possible for the connection terminals 70b, 71b, 72b, 73b, 74b and 75b of the metal conductive members 70, 71, 72, 73, 74 and 75 to serve as connection terminals through which a plurality of control boards are electrically connected. In addition, it is possible for the metal conductive members to transmit information regarding various conditions of battery cells, other than information regarding the voltage potential of each battery cell.

The first exemplary embodiment and the second exemplary embodiment have the structure in which the discharge duct 6 is composed of the first part 61 and the second part 62 which are assembled together. However, the concept of the present invention is not limited by the structures of the battery packs 1 and 1-1 according to the first and second exemplary embodiments previously described.

It is possible for the battery unit to have a structure in which at least one of the first part 61 and the second part 62 of the discharge duct 6 is composed of a plurality of components. That is, it is possible that the discharge duct 6 is composed of three or more components. It is also possible that the discharge duct 6 is composed of only a single member.

In the structure disclosed in the first exemplary embodiment and the second exemplary embodiment, the metal conductive members 70, 71, 72, 73, 74 and 75 are integrated with the discharge duct 6 by insert molding.

However, the concept of the present invention is not limited by the structures of the battery pack 1 according to the first exemplary embodiment and the battery pack 1-1 according to the second exemplary embodiment previously described.

It is possible to integrate metal conductive members and the cover casing which stores at least one of components such as battery cells and other components or passage formation member made of resin other than the discharge duct by insert molding. For example, it is possible to integrate the metal conductive members and the battery casing 7 or the insulation cover 8 by insert molding.

In the structure disclosed in the first exemplary embodiment and the second exemplary embodiment, the electrode terminals of the battery cells forming the assembled battery and the voltage detection circuit formed on the control board are electrically connected together through the metal conductive members. However, the concept of the present invention is not limited by the structures of the battery packs 1 and 1-1 according to the first and second exemplary embodiments previously described. For example, it is possible to electrically connect the electrode terminals of a single battery cell to the voltage detection circuit formed on the control board together through the metal conductive members.

The first and second exemplary embodiments previously described use a rechargeable battery (or a secondary battery) as a battery cell forming the battery unit (or battery pack).

However, the concept of the present invention is not limited by the structures of the battery packs 1 and 1-1 according to the first and second exemplary embodiments previously described. It is possible to use a primary battery as each battery cell.

(Other Features and Effects of the Present Invention)

The battery unit as another aspect of the present invention, further has safety valves 10c, 11c, 12c, 13c, 14c formed on the same surface of the exterior casing of the respective battery cells 10, 11, 12, 13, 14 on which the electrode terminals are formed. The safety valves 10c, 11c, 12c, 13c, 14c are configured to be opened when an internal pressure of each of the battery cells exceeds a predetermined pressure value. In the battery unit, the passage formation member is a discharge duct 6, 6A has the fluid inlets 61a corresponding to the safety valves 10c, 11c, 12c, 13c, 14c and an inner wall surface which faces the safety valves 10c, 11c, 12c, 13c, 14c through the fluid inlets. The safety valves 10C, 11c, 12c, 13c, 14c are exposed to the fluid passage 6a through the fluid inlets. In particular, the conductive members 70, 71, 72, 73, 74, 75 are integrated with the discharge duct 6, 6A by insert molding.

This makes it possible to provide an integrated body of the metal conductive members and the discharge duct to be made by insert molding. The discharge duct communicates with the safety valves formed on the electrode terminal formation surface of each of the battery cell. It is therefore possible to provide the battery unit with a simple structure.

In the battery unit as another aspect of the present invention, the discharge duct 6, 6A has the first part 61 and the second part 62 assembled together. The conductive members, namely, the metal conductive members 70, 71, 72, 73, 74, 75 are integrated with the second part 62 of the discharge duct 6, 6A by insert molding.

Because it is difficult to form or arrange the metal conductive members 70, 71, 72, 73, 74, 75 in the first part 61 which faces the battery cells 70, 71, 72, 73, 74, 75 side through the fluid inlets 61a, the metal conductive members 70, 71, 72, 73, 74, 75 are integrated with the second part 62 of the discharge duct 6, 6A by insert molding. The second part 62 of the discharge duct 6, 6A have no fluid inlet. This makes it possible to avoid the structure in which the metal conductive members 70, 71, 72, 73, 74, 75 are arranged to bypass the fluid inlets 61a, and to allow the metal conductive members 70, 71, 72, 73, 74, 75 to be arranged in the second part 62 of the discharge bust 6, 6A with an adequate margin.

In the battery unit as another aspect of the present invention, the discharge duct 6, 6A has exposed parts 70c, 71c, 72c, 73c, 74c so that a part of each of the conductive members is exposed to the fluid passage 6a formed in the discharge duct 6, 6A.

In general, when an internal pressure of a battery cell is excessively increased, and the safety valve of the battery cell is opened by the increased internal pressure, fluid and gas such as electrolyte solution are discharged from the inside of the battery cell through the safety valve. According to the battery unit (or battery pack) of the present invention, when the internal pressure of a battery cell exceeds a predetermined pressure, and the safety valve of this battery cell is opened, gas and electrolyte solution are discharged from the inside of the battery cell into the discharge passage 6a in the discharge duct 6, 6A through the opened safety valve. When such gas and electrolyte solution discharged from the battery cell are contacted with one more the metal conductive members, the metal conductive member is deteriorated and the electric resistance of the metal conductive member is significantly changed. When such gas and electrolyte solution are contacted with some of the metal conductive members 70, 71, 72, 73, 74 and 75 and a short circuit is made between the metal conductive members 70, 71, 72, 73, 74 and 75, an output of the voltage detection circuit formed on the control board 5 is significantly changed.

Accordingly, even if an electrode voltage potential of each battery cell is not significantly changed when at least one of the safety valves of the battery cells is opened under battery fault, the voltage control circuit formed on the control board 5 can detect an occurrence of such battery fault of the battery cell.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A battery unit comprising:
    a plurality of battery cells, each of the battery cells comprising an exterior casing and electrode terminals, electrode terminals having positive electrode terminals and negative electrode terminals, the positive electrode terminal and the negative electrode terminal being formed on an outside surface of the exterior casing of each of the battery cells;
    a control board having a voltage detection circuit configure to detect a voltage of each of the battery cells;
    a plurality of conductive members through which a voltage potential of the electrode terminals of the battery cells being transmitted to the voltage detection circuit, one end part of each of the conductive members being electrically connected to the corresponding electrode terminals of the battery cell, and the other end part of each of the conductive members being electrically connected to the voltage detection circuit;
    safety valves formed on a surface of the exterior casing of each of the battery cells on which the electrode terminals are formed, the safety valves configured to be opened when an internal pressure of the respective battery cells exceeds a predetermined pressure value; and
    a discharge duct made of resin as a passage formation member which forms a single fluid passage through which a fluid is discharged outside the battery unit when the safety valves are opened, the discharge duct comprising:
        a first part comprising fluid inlets arranged at the battery cells side, the fluid inlets being arranged corresponding to the safety valves, an inner wall surface of the first part facing the safety valves; and
        a second part assembled with the first part and having no fluid inlet,
    wherein the safety valves are exposed to the fluid passage through the fluid inlets,
    wherein the conductive members are insert-molded and integrally assembled with the second part only in the discharge duct, and
    wherein the discharge duct further comprises exposed parts so that a part of each of the conductive members is exposed to the fluid passage formed in the discharge duct.

2. The battery unit according to claim 1, wherein each of the exposed parts has a circular shape, and the exposed parts for the adjacent conductive members are closely formed in the discharge duct.

3. The battery unit according to claim 1, wherein a window part is formed at an end part of the second part in the discharge duct, and through the window part, a part of each of the conductive members is exposed from the second part, and the conductive members, which are made of metal, are exposed through the window part and are arranged at a constant interval.

4. The battery unit according to claim 1, wherein the discharge duct is a single discharge duct that forms the single fluid passage.

* * * * *